(12) United States Patent
Sevindik

(10) Patent No.: US 12,075,261 B2
(45) Date of Patent: *Aug. 27, 2024

(54) 5G BANDWIDTH PART CONFIGURATION METHOD IN CBRS FIXED WIRELESS ACCESS NETWORK

(71) Applicant: CHARTER COMMUNICATIONS OPERATING, LLC, St. Louis, MO (US)

(72) Inventor: Volkan Sevindik, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,387

(22) Filed: May 15, 2023

(65) Prior Publication Data

US 2023/0370855 A1 Nov. 16, 2023

Related U.S. Application Data

(63) Continuation of application No. 17/325,674, filed on May 20, 2021, now Pat. No. 11,653,218.

(51) Int. Cl.
*H04W 16/14* (2009.01)
*H04M 15/00* (2006.01)
(Continued)

(52) U.S. Cl.
CPC .......... *H04W 16/14* (2013.01); *H04M 15/66* (2013.01); *H04W 8/24* (2013.01); *H04W 72/0453* (2013.01); *H04W 84/12* (2013.01)

(58) Field of Classification Search
CPC ... H04W 16/14; H04W 8/24; H04W 72/0453; H04W 84/12; H04M 15/66
See application file for complete search history.

(56) References Cited

U.S. PATENT DOCUMENTS 11,082,977 B2 * 8/2021 Cimpu .............. H04W 72/0453
2019/0296882 A1 9/2019 Li et al.
(Continued)

FOREIGN PATENT DOCUMENTS

WO 20200067978 A1 4/2020
WO 220146643 A1 7/2020
(Continued)

OTHER PUBLICATIONS

3GPP TR 38.822 V15.0.1 3rd Generation Partnership Project; Technical Specification Group Radio Access Network; NR; User Equipment (UE) feature list; (Release 15), (Jul. 2019), 52 pages.
(Continued)

*Primary Examiner* — Abdullahi Ahmed
(74) *Attorney, Agent, or Firm* — Patent Beach PC

(57) ABSTRACT

Various embodiments comprise systems, methods, and apparatus for allocating resources in a 5G network comprising Citizens Broadband Radio Service Device (CBSD) nodes configured for communicating via granted spectrum with customer premises equipment (CPE) supporting wireless access points (WAPs) and the like, wherein an initial small bandwidth part (BWP) is assigned to each CPE, a BWP update process provides to a policy control function a list of devices/capabilities consuming CPE bandwidth so that the PCF may calculate a new bandwidth requirement for the CPE, the new requirement being used by the CPE to generate a CPE UE capability information message for the CBSD node, the CBSD node assigning an appropriately sized BWP for the CPE.

23 Claims, 2 Drawing Sheets

(51) Int. Cl.
*H04W 8/24* (2009.01)
*H04W 72/0453* (2023.01)
*H04W 84/12* (2009.01)

(56) References Cited

U.S. PATENT DOCUMENTS

| | | | | |
|---|---|---|---|---|
| 2020/0092712 | A1* | 3/2020 | Zhao | H04W 8/24 |
| 2020/0169339 | A1* | 5/2020 | Patel | H04W 16/20 |
| 2020/0259896 | A1* | 8/2020 | Sachs | H04J 3/0667 |
| 2021/0274499 | A1* | 9/2021 | Hmimy | H04W 36/30 |
| 2022/0182128 | A1* | 6/2022 | Taneja | H04W 72/51 |
| 2022/0182886 | A1* | 6/2022 | Saltsidis | H04W 28/22 |
| 2022/0295481 | A1* | 9/2022 | Furuichi | H04W 74/02 |

FOREIGN PATENT DOCUMENTS

| | | | |
|---|---|---|---|
| WO | 2020160543 | A1 | 8/2020 |
| WO | 2020205741 | A1 | 10/2020 |

OTHER PUBLICATIONS

3GPP TS 23.501 version 15.7.0 3rd Generation Partnership Project; Technical Specification, System architecture for the 5G System; (Release 15), (Oct. 2019), 250 pages.

3GPP TS 23.502, version 15.2.0 3rd Generation Partnership Project; Technical Specification Group Radio Access Network; NR; Medium Access control (MAC) protocol specification, Technical Specification, (Release 15), (Jun. 2018), 311 pages.

3GPP TS 38.211 version 16.2.0 Release 16, Physical Channels and Modulation; Technical Specification 5G; NR; ETSI TS 138 211 V16.2.0 (Jul. 2020), 136 pages.

3GPP TS 38.306 version 17.0.0 3rd Generation Partnership Project; Technical Specification, System architecture for the 5G System; NR; User Equipment (UE) radio access capabilities, (Release 17),( May 2022), 175 pages.

3rd Generation Partnership Project; Technical Specification Group Radio Access Network; NR; Medium Access Control (MAC) protocol specification (Release 16), 3GPP TS 38.321, V16.2.1, Technical Specification, Sep. 2020.

* cited by examiner

5G BANDWIDTH PART CONFIGURATION METHOD IN CBRS FIXED WIRELESS ACCESS NETWORK

CROSS-REFERENCE TO RELATED APPLICATIONS

This application is a continuation of U.S. application Ser. No. 17/325,674, filed May 20, 2021 which is hereby incorporated in its entirety by reference.

FIELD OF THE DISCLOSURE

The present disclosure generally relates to wireless communications systems and related networks, and more particularly to mechanisms for

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Fifth generation (5G) wireless access technology, known as New Radio (NR), as described/developed by the Third Generation Partnership Project (3GPP) includes an ability to allocate portions of available base station bandwidth to user equipment (UE) by assigning the UE a bandwidth part (BWP) based upon the category or capability of the UE, which may comprise a set of contiguous resource blocks configured inside a larger available channel bandwidth.

Unfortunately, the mechanisms by which BWP assignments are implemented are insufficiently precise is some applications, such as fixed wireless access (FWA) networks in which base stations (eNBs, gNBs) wirelessly communicate with customer premises equipment (CPE), which in turn wirelessly communicate with and provide network services to user equipment (UE) attached thereto. A BWP allocated to such CPE may be insufficient or wasteful depending on the amount of attached UE and the network services provided to the UE.

SUMMARY

Various deficiencies in the prior art are addressed by systems, methods, and apparatus for allocating resources in a 5G network comprising Citizens Broadband Radio Service Device (CBSD) nodes configured for communicating via granted spectrum with customer premises equipment (CPE) supporting wireless access points (WAPs) and the like, wherein an initial small bandwidth part (BWP) is assigned or allocated to each CPE, a BWP update process provides to a policy control function a list of devices/capabilities consuming CPE bandwidth so that the PCF may calculate a new bandwidth requirement for the CPE, the new requirement being used by the CPE to generate a CPE UE capability information message for the CBSD node, the CBSD node assigning/allocating an appropriately sized BWP for the CPE.

One embodiment comprises a method for allocating resources in a 5G network comprising Citizens Broadband Radio Service Device (CBSD) nodes configured for communicating via granted spectrum with customer premises equipment (CPE) and user equipment (UE) to provide network services thereto, the method comprising: at a policy control function (PCF) at a core network serving a CBSD node having at least one CPE connecting thereto and assigned a respective low resource bandwidth part (BWP), receiving from the CBSD node a list of CPE connected devices supported by the CBSD node; at the PCF, calculating for each CPE a bandwidth requirement sufficient to support respective CPE connected devices, and transmitting the calculated CPE bandwidth requirements toward the CBSD for use by the CPE; each CPE bandwidth requirement being configured to cause a respective CPE to determine a UE capability information sufficient to support the CPE bandwidth requirement, the UE capability information enabling the CBSD to assign a BWP to the CPE sufficient to support the determined UE capability information.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
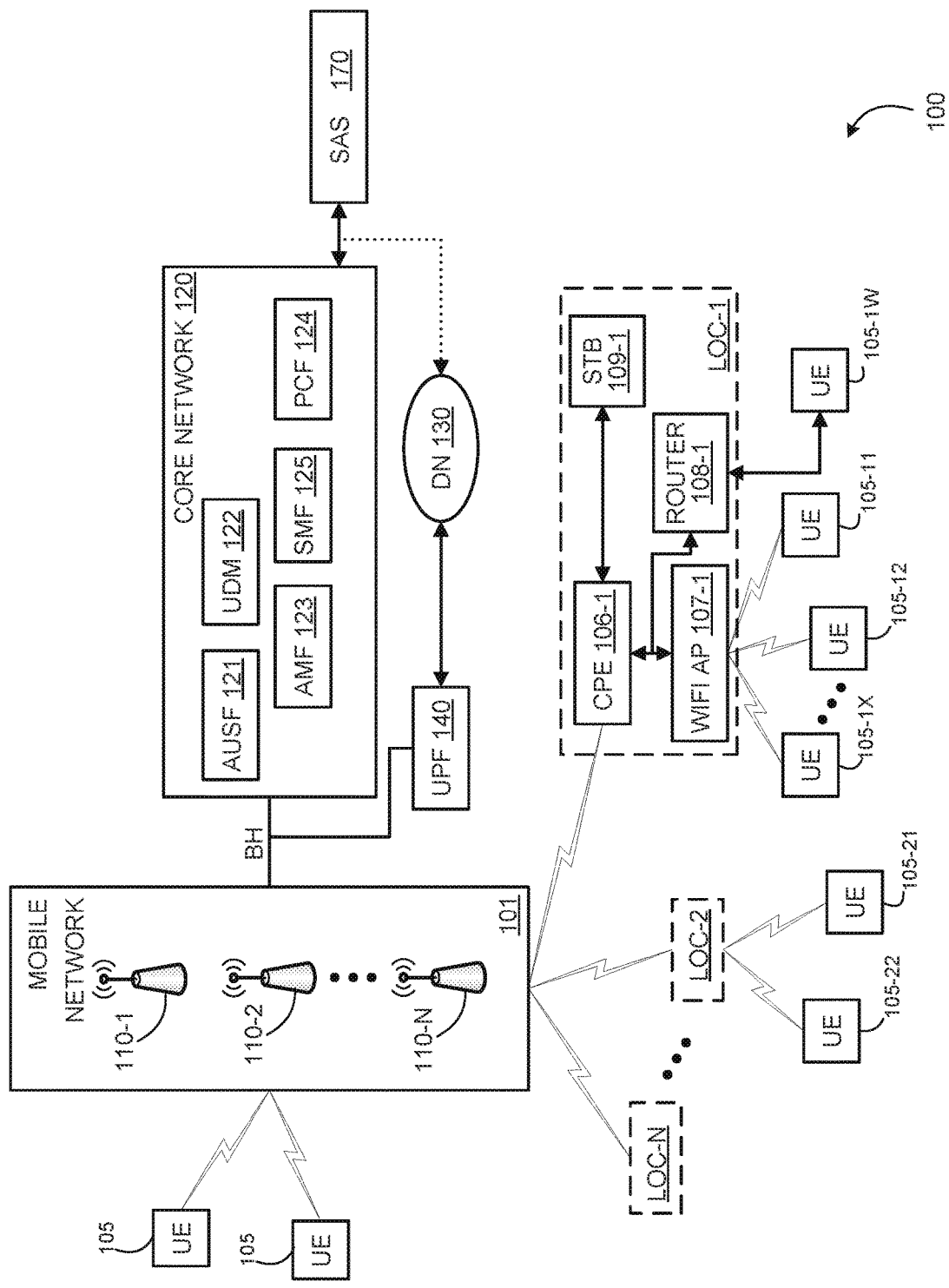
FIG. 1 depicts a block diagram of a network architecture benefiting from the various embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments find particular utility within the context of fixed wireless access (FWA) in which base stations (eNBs, gNBs) such as associated with a 5G mobile network wirelessly communicate with customer premises equipment (CPE) at each of a plurality of locations. Each CPE is assigned a bandwidth part (BWP) by its respective base station. The assigned bandwidth part is dynamically adapted in response to changes in bandwidth requirements experienced by the CPE, such as due to changes in the number of wireless devices attached to wireless access points (WAPs) supported by the CPE, set top boxes (STBs) supported by the CPE, and/or other wireless or wired devices connected to or receiving bandwidth-consuming services via the CPE. It will be noted that the various embodiments are applicable to other architectures, topologies, networks and the like beyond those specifically described herein.

Generally speaking, the various embodiments find utility within the context of any bandwidth distributing/sharing device requiring a BWP assignment from a network node (e.g., base station, eNB/gNB) connected thereto, such as the local CPE described herein, where the device capability does not necessarily reflect the actual bandwidth consumption of the device itself or other devices/services supported by the device. The various embodiments described herein provide a BWP update process that is triggered for each CPE associated with a network node (e.g., base station, eNB/gNB) such that each CPE is generally allocated bandwidth as needed for a current mix of, illustratively, wireless access point (WAP) connected access terminals (ATs) and the liked so that, illustratively, a total spectrum allocated to a CBSD network node may be used as efficiently as possible.

FIG. 1 depicts a block diagram of a network architecture benefiting from the various embodiments. The network architecture 100 of FIG. 1 is depicted as, illustratively, a fixed wireless access (FWA) network 100 in which a plurality of 5G base stations or network nodes 110 (eNBs, gNBs) forming a mobile network 101 are configured to wirelessly communicate with, and provide backhaul services to, user equipment (UE) 105, customer premises equipment (CPE) 106 functioning as UE with respect to the mobile network 101, and/or other devices. CPE 106 may support respective local WiFi access points (WAPs) 107 and the traffic associated with respective Wifi devices connected thereto, including diverse sets of traffic types such as having different throughput and/or latency requirements.

As depicted in FIG. 1, service-based architecture of a 5G core network 120 is depicted in a simplified form as comprising a number of core network nodes or network functions (NFs) such as described in relevant standards documents such as the 3GPP standards for 5G (e.g. 3GPP 23.501 and 23.502), including an authentication server function (AUSF) 121, a unified data management (UDM) 122 (having a unified data repository or UDR), an Access and Mobility Function (AMF) 123, a policy control function (PCF) 124, and a service management function (SMF) 125. A plurality of interfaces or reference points N1 through N15 define the communications and/or protocols between each of the entities, as described in the relevant (evolving) standards documents. One or more application functions (AFs) may connect to the 5G mobile network via PCF 124. One or more data networks (DN) 130 having application servers (AS) may be connected to the 5G mobile network through UPFs such as UPF 140. The depicted core network 120 of the 5G mobile network of FIG. 1 may also include various other network node functions (not shown for simplicity) along with their relevant interfaces.

As depicted in FIG. 1, UE 105 and CPE 106 are configured for wirelessly communicating with the mobile network 101 (e.g., a 5G radio access network), illustratively comprising a plurality of base stations, gNBs, or eNBs depicted herein as network nodes 110-1 through 110-N, which are connected to the 5G core network 120 via back haul (BH) and/or other communications links. The gNB may be formed as logical nodes or groupings of resources at a radio access network (R)AN or RAN such as implemented at network nodes 110 within the mobile network 101. The gNB formed thereat may be configured with more or fewer RAN resources so at to have features and/or capabilities selected in response to the type and number of UE and CPE connected thereto, the type of services being provided thereby, and so on.

UE 105 and CPE 106 provide capability information, category information, feature set information, feature set combination information and so on in accordance with various relevant protocols to indicate radio access capability parameters such as UE/CPE downlink (DL), uplink (UL) capability, and sidelink (SL) capability (i.e., maximum data rate, buffer size, and the like), transport block size, supported layers, supported modulation schemes, supported frequencies, and other features/capabilities. In response to this feature/capability information, a BWP may be assigned to the UE or CPE.

For example, a UE capability exchange or capability transfer may include the transfer of UE radio access capability information from a UE to the network. A network node such as a base station, eNB, gNB, router, access network node, core network node and the like may need to know the UE's capabilities in order to more effectively use the radio capabilities and/or other capabilities of the UE and the network with respect to different features, such as supported frequency bands or combinations thereof, DL/UL bandwidth class, multiple-input multiple-output (MIMO) antenna technology capability, dual Connectivity support, simultaneous RxTx, supported CSI-RS processes, and so on (there are numerous UE capability information elements that may be used within the context of the 5G communications standards and other standards documents).

The network node may use the UE capability information during configurations of data radio bearer (DRB), MAC, PHY, and the like. A network node may transmit a UECapabilityEnquiry to the UE, requesting the UE to respond with UE radio access capability information. The UE responds with a UECapabilityinformation message. The network node may use the capability information received to set up the MAC and PHY configuration (receive and transmit capabilities, e.g., single/dual radio, dual receiver) of the RRC connection. This exchange may also enable efficient measurement control.

Each UE 105 directly communicating with a network node 110 is assigned a bandwidth part (BWP) by its respective network node 110 in accordance with the capability of the UE 105. Similarly, each CPE 106 communicating with a network node 110 is assigned a BWP by its respective network node 110 in accordance with the capability of the CPE. Within the context of the various embodiments, the CPE 106 and UE 105 function substantially similarly to each other with respect to the mobile network 101 in terms of control plane and data plane signaling/operations, though the CPE 106 may have significantly more capability and/or bandwidth requirements than a single UE 105.

For example, a UE 105 directly communicating with a network node 110 may provide single UE capability information having fields of 'Supported DL Throughput=100 Mbps', 'Supported UL Throughput=50 Mbps' and the like, wherein the BWP assigned/allocated to this UE will be sized accordingly.

Similarly, a CPE 106 directly communicating with a network node 110 and supporting a WAP 107 serving two such UEs operating as ATs thereto, may provide single UE capability information having fields of 'Supported DL Throughput=200 Mbps', 'Supported UL Throughput=100 Mbps' and the like, wherein the BWP assigned/allocated to this CPE will be sized accordingly. The CPE 106 is providing, in effect, an aggregated capability message to reflect the total bandwidth requirements (and other requirements) of the CPE in supporting the two UE in this example.

Various embodiments dynamically adapt the size of, for example, CPE-assigned BWPs in response to changes in bandwidth requirements experienced by the CPE, such as due to changes in a number of wireless devices, such as user equipment (UE) operating as Access Terminals (ATs), attached to wireless access points (WAPs) supported by the CPE, set top boxes (STBs) supported by the CPE, and/or other wireless or wired devices connected to or receiving bandwidth consuming services via the CPE.

At least some of the UE 105 may also function as WiFi Access Terminals (ATs) for wirelessly communicating with wireless access points (WAPs) 107 deployed at various of locations LOC and supported thereat by customer premises equipment (CPE) 106 configured for wirelessly communicating with the mobile network 101.

For example, a first location LOC-1 is depicted as including CPE 106-1 configured to support a WAP 107-1, a router 108-1, and a set top box (STB) 109-1. The WAP 107-1 is depicted as communicating with a plurality of wireless devices, namely, UE 105-11 through 105-1X. The router 108-1 is depicted as communicating with wired UE 105-1W. The STB 109-1 may be a standard cable television STB configured to deliver broadcast, video on-demand (VOD), and/or other media related services. Further, the STB 109-1 may include a local digital video recorder (DVR) configured to periodically core programming from various channels accessible to the STB 109 such as in accordance with the service level agreement (SLA) of the subscriber associated with the location LOC-1.

The network nodes 110 may comprise macrocells, small cells, microcells and the like such as eNodeBs (eNBs), cellular network base stations, repeaters, and similar types of provider equipment or logical radio nodes (e.g., gNBs) derived therefrom. The network nodes 110 and various RAN resources may comprise resources using licensed spectrum, unlicensed spectrum such as citizens broadband radio service (CBRS) spectrum, or a combination of licensed and unlicensed spectrum. The network nodes 110 may, in various embodiments, include mid-band (e.g., 3.5 GHz) gNBs, low-band (e.g., under 1 GHz) gNBs, or a combination of mid-band and low-band gNBs.

In the case of network nodes 110 having Citizens Broadband Radio Service Device (CBSD) capability, allocations of CBRS spectrum are provided via a Spectrum Access System (SAS) 170. Generally speaking, the SAS 170 communicates with the 5G core network 120 (optionally with the DN 130) and is configured to control access to the CBRS frequency band for CBSD network nodes 110, UE 105, CBE 106 and other CBSD devices. Generally speaking, the SAS 170 is configured to ensure that the CBRS frequency band is allocated for CBSD use, and that such use is adapted government requirements, network congestion, network interference and the like.

The WAPs 107 may comprise 802.11xx (e.g., 802.11b, 802.11a, 802.11g, 802.11n, 802.11ac, 802.11ax and so on) wireless access points at homes, businesses, or other location that are configured to communicate with supporting CPE 106. In various embodiments, a network services provider utilizes numerous such access points distributed over a "coverage footprint" to provide network services to mobile devices such as the UE 105 discussed herein. In various embodiments, each WAP 107 maintains a list of the ATs connected thereto, the list being provided to the CED 106 as needed in accordance with the embodiments described herein.

Each network node 110 provides network services to UE 105 and CPE 106 via respective radio bearer (channels/resources) which are managed by various Radio Resource Management functions, such as Radio Bearer Control, Radio Admission Control, Connection Mobility Control, Scheduling of UE/CPE in both uplink and downlink, assignment of bandwidth parts (BWPs) to UE/CPE and so on. The Radio Resource Management functions are configured to provide appropriate Quality of Service (QoS) levels to the UE/CPE using one or more radio bearers, such as to maximize throughput at the network node 110 while maintaining "fairness" to the UE/CPE attached thereto, to monitor various performance metrics, to provide data to the core network or network management entities and the like.

Generally speaking, each of the CBSD network nodes 110 and non-CBSD network nodes 110 utilizes defined frequency ranges (FRs), such as FR1 (~410 MHz to 7125 MHz), FR2 (~24.25 GHz to 52.6 GHz), and so on. These frequency ranges may include both licensed and unlicensed spectrum as discussed elsewhere herein, where unlicensed spectrum includes CBRS spectral regions used by CBSD network nodes 110. Each of the spectral regions includes a plurality of operating bands, wherein each operating band is a frequency band associated with a certain set of radio frequency (RF) requirements. Bandwidths of different operating bands can vary from several MHz to a few GHz. Further, 5G NR supports a range of channel bandwidths from 5-400 MHz, where a channel bandwidth refers to the bandwidth of an NR carrier. The number of resource blocks (RBs) that may be configured in a channel bandwidth, known as transmission bandwidth configuration, meets specified minimum guard band requirements. In various embodiments, a new radio (NR) RB is used, wherein the NR RB contains 12 sub-carriers in a resource block bandwidth fixed to 180 KHz, however resource block bandwidths larger or smaller than 180 KHz may be used in the various embodiments, such as may depend on sub-carrier spacing and the like.

Different types of UE 105 and/or CPE 106 may be able to support different channel bandwidths, and so different types of UE 105 and CPE 106 may be assigned bandwidth parts (BWPs) of differing size, where each BWP comprises a set of contiguous RBs configured inside a channel bandwidth, typically ranging from 1 RB to 275 RBs.

As noted in 3GPP TS 38.211, "NR; Physical channels and modulation," NR defines scalable orthogonal frequency division multiplexing (OFDM) numerologies using subcarrier spacing (SCS) of $2\mu \cdot 15$ kHz ($\mu=0, 1, \ldots, 4$). An RB consists of 12 consecutive subcarriers in the frequency domain. Each BWP starts at a certain common RB and consists of a set of contiguous RBs with a given numerology (SCS and cyclic prefix) on a given carrier. For each serving cell of a UE, the network configures at least one downlink (DL) BWP (i.e., the initial DL BWP). The network may configure the UE with up to four DL BWPs, but only one DL BWP can be active at a given time. If the serving cell is configured with an uplink (UL), the network configures at least one UL BWP. Similar to the DL, the network may configure the UE with up to four UL BWPs, but only one UL BWP can be active at a given time. NR also supports a so-called supplementary UL (SUL), on which UL BWP(s) can be similarly configured as on a normal UL. Other modifications are also contemplated herein.

In general, UE/CPE 105/106 communicating via the mobile network 101 only receive physical downlink shared channel (PDSCH), physical downlink control channel (PDCCH), or channel state information reference signal (CSI-RS) inside an active DL BWP. But the UE/CPE may need to perform radio resource management (RRM) measurements outside the active DL BWP via measurement gaps. Similarly, the UE/CPE only transmits physical uplink shared channel (PUSCH) or physical uplink control channel (PUCCH) inside an active UL BWP and, for an active serving cell, the UE/CPE does not transmit sounding reference signal (SRS) outside an active UL BWP.

Each network node 110 may include a Scheduler to implement uplink/downlink scheduling functions so as to allocate radio bearer resources to attached UE in accordance with appropriate QoS levels, which may comprise default QoS levels, QoS levels defined via Service Level Agreements (SLAs) of subscriber-associated with the UE, or some other mechanism. These radio bearer resources may be allocated in accordance with per-bearer QoS parameters such as QoS Class Identifiers (QCIs) which identify particular services or classes of services, Guaranteed Bit Rate (GBR) and/or Prioritized Bit Rate (PBR) which enable a determination as to specific radio bearers (e.g., specific UE) to accept, modify, or drop in response to a constrained resource condition, Allocation and Retention Policies (ARP) and the like. An Aggregate Maximum Bit Rate (AMBR) may be used to define a total bandwidth that may be utilized by a specific group of radio bearers (e.g., total bandwidth used supporting multiple network services associated with a one UE).

In various embodiments, network node 110 scheduling decisions are dynamically signaled on a L1/L2 physical downlink control channel (PDCCH), which may periodically (e.g., at a 1 ms transmission time interval) provide downlink schedule (DL-SCH) and/or uplink schedule (UL-SCH) information. Additional PDCCH information provided to the UE may comprise physical resource allocation, Modulation and Coding scheme, New-Data indicator, Transport Block size, Redundancy version, HARQ Process ID and the like. To avoid frequent signaling (i.e., every 1 ms) semi-persistent scheduling may also be employed, such as to define UL/DL resources for a radio bearer used for a periodic type of transmission, or a transmission of a known size or duration. For example, resources defined in terms of sub-carriers, slots, resource blocks (RBs) and the like may be allocated to specific UE such as in accordance with a resource block map provided to UE via an uplink (UL) grant schedule.

The UE 105 may comprise any type of wireless device configured for use in accordance with the various embodiments, such as user terminals (e.g., mobile phones, laptops, tablets and the like), fixed wireless access devices (e.g., set top boxes, digital video recorders, stationary computing devices and the like), Internet of Things (IoT) devices (e.g., sensors, monitoring devices, alarm system devices and the like), and/or other wireless devices. The UE 105 may include UE that use licensed spectrum, unlicensed spectrum such as CBRS spectrum, or a combination of licensed and unlicensed spectrum. In the case of network nodes 110 having CBSD capability, allocations of CBRS spectrum are provided via SAS 170.

As depicted in FIG. 1, a Spectrum Access System (SAS) 140 communicates with the core network 120 (optionally with the DN 130) and is configured to control access to the CBRS frequency band for RANs and other CBSD devices such as network nodes 110, UE 105, and CPE 106. Generally speaking, the SAS 170 is configured to ensure that the CBRS frequency band is allocated for CBSD use, and that such use is adapted government requirements, network congestion, network interference and the like.

Various elements or portions thereof depicted in FIG. 1 and having functions described herein are implemented at least in part as computing devices having communications capabilities, including for example the UE 105, CPE 106, WAP 107, network nodes 110, SAS 170, UPF 140, and various network nodes and network functions of the core network 120. These elements or portions thereof have computing devices of various types, though generally a processor element (e.g., a central processing unit (CPU) or other suitable processor(s)), a memory (e.g., random access memory (RAM), read only memory (ROM), and the like), various communications interfaces (e.g., more interfaces enabling communications via different networks/RATs), input/output interfaces (e.g., GUI delivery mechanism, user input reception mechanism, web portal interacting with remote workstations and so on) and the like.

For example, various embodiments are implemented using network equipment used to implement network functions at a network core, network equipment comprising processing resources (e.g., one or more servers, processors and/or virtualized processing elements or compute resources) and non-transitory memory resources (e.g., one or more storage devices, memories and/or virtualized memory elements or storage resources), wherein the processing resources are configured to execute software instructions stored in the non-transitory memory resources to implement thereby the various methods and processes described herein. The network equipment may also be used to provide some or all of the various other core network nodes or functions described herein.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Figure 2:
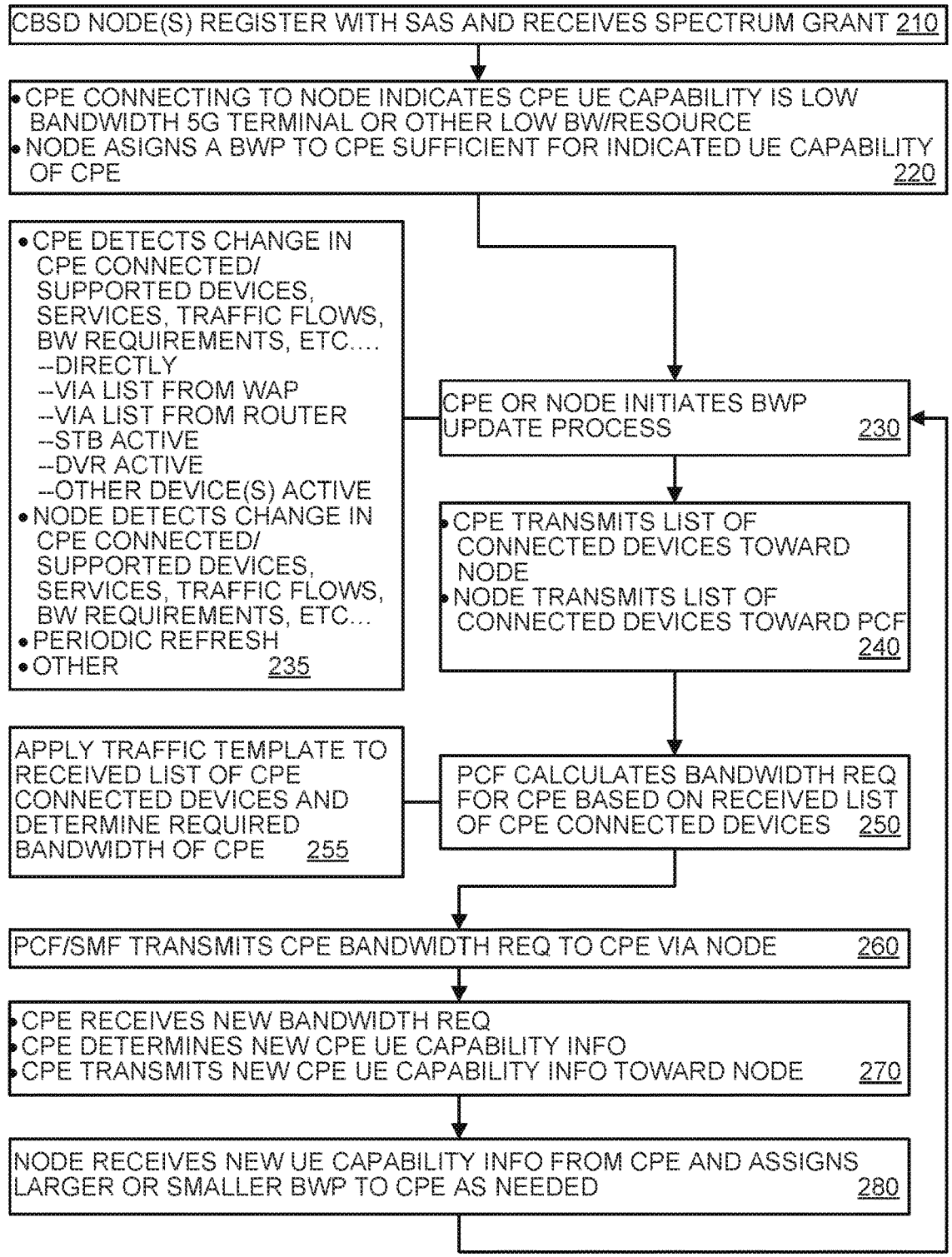
FIG. 2 depicts a flow diagram of a method dynamically assigning bandwidth parts to customer premises equipment (CPE)

FIG. 2 depicts a flow diagram of a method dynamically assigning bandwidth parts to customer premises equipment (CPE) such as within a fixed wireless network. The method 200 of FIG. 2 contemplates various functions performed by UE 105, network nodes 110, CPE 106, SAS 170, core network 120, and other functional entities as described above with respect to FIG. 1. However, it will be appreciated that the teachings herein described with respect to the various embodiments are applicable to numerous other embodiments not specifically discussed.

Generally speaking, the method 200 of FIG. 2 is directed to managing bandwidth parts assigned by network nodes 110 such as CBSD nodes (illustratively eNBs 110 or gNBs formed at network nodes 110) to CPE 106 connected thereto. The method 200 of FIG. 2 may be used within the context of network nodes 110 that are both CBSD and non-CBSD nodes, though CBSD node embodiments are primarily described herein.

At step 210, any network nodes 110 operating as CBSD nodes register with the SAS 170 and receive spectrum grants therefrom. Each spectrum grant defines the unlicensed spectrum location and, therefore, bandwidth usable by a CBSD network node 110 for communications with UE 105 and/or CPE 106.

At step 220, one or more CPE 106 connecting to a network node 110 (CBSD or non-CBSD node), illustratively eNB 110 or a gNB formed at a network node 110. For each newly connecting CPE, the CPE indicates initial CPE UE capability information as comprising a "low bandwidth 5G terminal" or some capability requiring low bandwidth or low resource allocations. Also at step 220, the node assigns a bandwidth part (BWP) to the CPE of sufficient size for the indicated CPE UE capability information. In various embodiments, the assigned BWP may be sized as 100% of the indicated requirement, or 120%, 130%, 150% and so on as desired and within the bandwidth constrains imposed upon the network node 110 by the SAS spectrum allocation and other UE/CPE being serviced thereby.

For example, the CPE 106 may transmit its UE capability information to the network node 110 as part of a UECapabilityinformation message asynchronously or in response to a UECapabilityEnquiry message received from the network node 110 or other network element. Referring to box 225, the initial UE capability information may comprise "UE capability information" generated by the CPE, a default UE capability information of the CPE, or UE capability information of the CPE defined in some other manner (e.g., CPE 106 aggregating UE capability information associated with one or more UE 105 supported by the CPE 106 such as via a WAP 107 or other device). In various embodiments, the initial UE capability information associated with the CPE 106 is that indicative of a "low bandwidth 5G terminal" or other low to moderate bandwidth type of UE.

Generally speaking, UEs (and CPE functioning as UE as in the present embodiments) typically support only a subset of the specified radio access features due to implementation constraints and test limitation. The UE/CPE sends its capability parameters to the network and the network configures and schedules the UE/CPE accordingly.

The UE/CPE only receives PDCCH and PDSCH in an active DL BWP and transmits PUCCH and PUSCH in an active UL BWP per serving cell. It is mandatory for a UE to support the basic BWP operation of one RRC configured DL BWP and one RRC configure UL BWP.

For the initial access, a UE 105 or CPE 106 needs to perform cell search and downlink synchronization by detecting SSB and acquire SIB1 by decoding DCI transmitted in CORESET #0. The bandwidths of SSB and CORESET #0 may or may not be included in a DL BWP.

Supporting bandwidth adaptation with more than one DL/UL RRC configured BWPs and switching among BWPs are optional. UE/CPE may support bandwidth adaptation with up to two or four RRC configured DL and/or UL BWPs with the same numerology per serving cell, or with up to four RRC configured DL and/or UL BWPs with different numerologies per serving cell.

In some embodiments, CPE 106 connecting to a network node 110 for the first time transmits the "low bandwidth 5G terminal" UE capability information to receive a minimal bandwidth assignment/allocation, where the minimal bandwidth assignment/allocation will be increased as appropriate depending upon future bandwidth requirements associated with the CPE. In some embodiments, CPE 106 connecting to a network node 110 for the first time or subsequent to the first connection transmit UE capability information indicative of a UE/CPE capability at least roughly approximating a current or expected CPE traffic or bandwidth requirement. In either of these embodiments, at step 220 the UE capability information received by the network node 110 is transmitted toward the PCF 124 for further processing as discussed below.

UE capability information associated with the CPE 106 may be provided as discussed herein and/or in accordance with the relevant 5G standards documents, such as discussed at length in 3GPP TS 38.306, "NR; User Equipment (UE) radio access capabilities," 3GPP TR 38.822, "NR; User Equipment (UE) feature list" and other documents as is known. For example, UE capability messages from UE 105 or CPE 106 may include capability indicative information in any of numerous fields, sub-sets, features, and/or combinations thereof, which messages may be processed by the PCF as discussed herein with respect to the various embodiments.

It is noted that initial downlink/uplink are used at least for initial access before radio resource control (RRC) connection is established. An initial BWP has index zero and is referred to as BWP #0. During the initial access, the UE (or CPE acting as UE) performs cell search based on synchronization signal block (SSB) composed of primary synchronization signal (PSS), secondary synchronization signal (SSS), and physical broadcast channel (PBCH). To access the system, the UE needs to further read system information block 1 (SIB1) which carries important information including the initial DL/UL BWP configuration. The SIB1 is transmitted on the PDSCH, which is scheduled by downlink control information (DCI) on the PDCCH using the control resource set with index zero (CORESET #0).

Before the UE reads the SIB1, the UE's initial DL BWP has the same frequency range and numerology as those of CORESET #0. After reading the SIB1, the UE follows the initial DL/UL BWP configuration in the SIB1 and uses them to carry out random-access procedure to request the setup of RRC connection. The network should configure the frequency domain location and bandwidth of the initial DL BWP in the SIB1 so that the initial DL BWP contains the entire CORESET #0 in the frequency domain.

First active DL and UL BWPs may be configured for a Special Cell (SpCell) or a secondary cell (SCell). In a master cell group (MCG), the SpCell refers to the primary cell (PCell) in which the UE/CPE performs the connection establishment or the establishment procedure. In a secondary cell group (SCG), the SpCell refers to the primary SCG cell (PSCell) in which the UE/CPE performs random access for RRC (re-)configuration. An SCell provides additional radio resources on top of an SpCell in a cell group. The first active DL and UL BWPs are the active DL and UL BWPs upon RRC (re-)configuration for an SpCell or activation of an SCell.

A default BWP may be configured for a serving cell, the network may configure the UE/CPE with a BWP inactivity timer. The expiration of this timer may, for example, indicate that the UE/CPE has no scheduled transmission and reception for a while on the currently active BWP. Thus, the UE/CPE can switch its active BWP to a default BWP to save power. The default DL BWP can be configured. If not configured, the UE/CPE uses the initial DL BWP as the default DL BWP. For unpaired spectrum, when the UE/CPE switches its active DL BWP to the default DL BWP, the active UL BWP is switched accordingly since the BWP switching for TDD is common for both DL and UL.

At step 230, a CPE 106 or a network node 110 initiates or triggers a BWP update process. Referring to box 235, in various embodiments the BWP update process may be initiated/triggered when the CPE 106 detects changes in a number/type of connected UE 105 (e.g., connected as AT to a WAP 107 supported by the CPE 106), a change in number/type of services required by connected UE/ATs, or a change in number/type of services required by other types of devices connected directly or indirectly to the CPE 106 and utilizing bandwidth provided thereby. Such UE/AT 105 or other devices may be connected to the CPE 106 via a WAP 107, a router 108, or by some other means. For example, activation of a set top box or digital video recorder to begin receiving one or more media streams by the CPE 106 they also trigger a need to increase the size of a BWP associated with that CPE 106. In various embodiments, the BWP update process may be initiated when the network node 110 detects a change in CPE traffic, number/type of CPE-connected UE, number/type of services being supported by the CPE and so on. In various embodiments the BWP update process is initiated by the expiration of a timer, a periodic refresh or update of the BWP associated with CPE 106. Thus, a CBSD determined triggering condition may comprise at least one of the CBSD node detecting a change in CPE traffic, a change in a CPE-connected UE, a change in CPE supported services, and a periodic refresh schedule.

At step 240, the CPE transmits information/messages reflecting a list of directly or indirectly supported bandwidth consuming devices toward the network node 110, which in turn transmits information/messages reflecting this list toward the policy control function (PCF) of the core network.

Specifically, in various embodiments, each WAP 107 and router 108 maintains a list of the respective devices connected thereto (including an indication of their bandwidth requirements), such as access terminal (ATs) and the like. Each CPE 106 is able to maintain or forward a corresponding list of its respective supported WAPs 107 and routers 108, along with the corresponding lists of respective devices connected thereto. In this manner, the bandwidth requirements of the CPE 106 to support bandwidth consuming devices directly or indirectly connected thereto may be known. Other mechanisms may also be used, such as lists of devices, device capabilities, current/predicted traffic flows, current/predicted services, and so on.

At step 250, after propagation through the various backhaul networks, the network core control plane and/or transmission paths, and the SMF 125, the PCF 124 calculates a bandwidth requirement for the CPE based upon the received list(s) of bandwidth consuming devices supported by the CPE.

Referring to box 255, in various embodiments the PCF applies a traffic template to the received list of bandwidth consuming devices directly or indirectly connected to the CPE to determine expected traffic or bandwidth needed by the CPE. The traffic template may be an operator specific traffic template, and may define or be controlled/constrained by a service level agreement (SLA) with the subscriber(s) associated with bandwidth consuming devices utilizing the CPE 106 for various network services. Other means the be used to define expected bandwidth requirements associated with the CPE.

The bandwidth requirement may be calculated in any manner appropriate to the UE 105, CPE 106, and/or network nodes 110 such as described within the relevant standards body specifications. In some embodiments, the calculation is performed as follows (assuming a resource block bandwidth of 180 kHz):

$$CPEbw = \frac{\text{Amount of traffic for all } UE \text{ connected to } CPE}{((OFDM \text{ symbols per physical } RB)*} * 180 \text{ kHz} \qquad \text{(eq. 1)}$$
$$\text{(bits per } OFDM \text{ symbol))}$$

At step 260, the PCF transmits the CPE bandwidth requirement (e.g., CPEbw) toward the relevant CPE via the SMF, the and backhaul networks, and the network node 110 associated with the relevant CPE 106.

At step 270, the CPE receives the new bandwidth requirement (e.g., CPEbw), responsively determines a new CPE "UE capability information" that is sized to support the new bandwidth requirement, and transmits the new CPE UE capability information to the network node.

At step 280, the network node 110 receives the new CPE UE capability information and responsively assigns a larger or smaller bandwidth part to the CPE 106 as appropriate (or leaves the BWP the same if that is appropriate). That is, the network node 110 transmits an RRC reconfiguration message configured to indicate that the CPE is assigned a new BWP (assuming such a new BWP would be different than an existing assigned BWP).

For example, at step 280 a BWP switching procedure may be invoked wherein the existing downlink and/or uplink BWPs associated with the CPE are switched, separately or contemporaneously, to corresponding new downlink and/or uplink BWPs in accordance with the UE capability information received from the CPE 106.

Advantageously, in the various embodiments described herein the BWP update process is triggered for each CPE associated with a network node such that each CPE is generally assignment/allocation bandwidth as needed for a current mix of WAP-connected ATs and the liked so that the total spectrum allocated to a CBSD node may be used as efficiently as possible.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A method for allocating resources in a 5G network comprising Citizens Broadband Radio Service Device (CBSD) nodes configured for communicating via granted spectrum with customer premises equipment (CPE) and user equipment (UE) to provide network services thereto, the method comprising:
   at a policy control function (PCF) of a core network serving a CBSD node having at least one CPE connecting thereto and assigned a respective low resource bandwidth part (BWP), receiving from the CBSD node a list of CPE connected devices supported by the CBSD node; and
   at the PCF, calculating for the at least one CPE, at least one respective bandwidth requirement sufficient to support respective ones of the CPE connected devices, and transmitting the at least one respective bandwidth requirement toward the CBSD node for use by the at least one CPE;
   wherein the at least one respective bandwidth requirement is configured to cause the at least one CPE to determine CPE UE capability information sufficient to support the at least one respective bandwidth requirement, the CPE UE capability information enabling the CBSD node to assign a BWP to the at least one CPE sufficient to support the determined CPE UE capability information.

2. The method of claim 1, wherein the PCF applies a traffic template to the list of CPE connected devices to determine the at least one respective bandwidth requirement.

3. The method of claim 1, wherein the list of CPE connected devices comprises a list of CPE connected devices which are directly connected and indirectly connected to the CBSD node.

4. The method of claim 1, wherein the low resource BWP is selected to provide sufficient bandwidth for one or more of the at least one CPE having a UE capability of "low bandwidth 5G terminal".

5. The method of claim 1, wherein the low resource BWP comprises a default BWP.

6. The method of claim 5, further comprising configuring the at least one CPE with a BWP inactivity timer, wherein expiration of the BWP inactivity timer at the at least one CPE causes the at least one CPE to switch from an active BWP to the default BWP.

7. The method of claim 1, wherein the low resource BWP is determined in response to the CPE UE capability information received by the CBSD node.

8. The method of claim 7, wherein the CPE UE capability information comprises at least one of an uplink (UL) bandwidth capability and a downlink (DL) bandwidth capability.

9. The method of claim 8, wherein the CPE UE capability information comprises at least one of UL buffer size and DL buffer size.

10. The method of claim 1, wherein the list of CPE connected devices comprises a list of access terminals (ATs) connected to one or more wireless access points (WAPs) supported by the at least one CPE.

11. The method of claim 1, wherein the list of CPE connected devices comprises a list of devices connected to one or more routers supported by the at least one CPE.

12. The method of claim 1, wherein the list of CPE connected devices comprises a list of set top boxes (STBs) supported by the at least one CPE.

13. The method of claim 1, wherein the at least one respective bandwidth requirement is calculated as:

$$CPEbw = \frac{\text{Amount of traffic for all } UE \text{ connected to } CPE}{((OFDM \text{ symbols per physical } RB) * (\text{bits per } OFDM \text{ symbol}))}$$

$$(RB \text{ bandwidth}).$$

14. The method of claim 13, wherein the RB (resource block) bandwidth is 180 kHz.

15. The method of claim 1, wherein the CBSD node is part of a fixed wireless access (FWA) network and configured to provide backhaul services to UE communicating thereto via the at least one CPE.

16. The method of claim 15, wherein the UE comprise at least one of user terminals, fixed wireless access devices, and Internet of Things (IOT) devices.

17. The method of claim 1, wherein the list of CPE connected devices supported by the CBSD node is associated with UECapabilityinformation messages transmitted by the at least one CPE to the CBSD node.

18. The method of claim 1, wherein the list of CPE connected devices supported by the CBSD node is received in response to a triggering condition.

19. The method of claim 18, wherein the triggering condition comprises the at least one CPE detecting a change in a number of access terminals (ATs) connected to a wireless access point (WAP) supported by the at least one CPE.

20. The method of claim 18, wherein the triggering condition comprises the at least one CPE detecting a change in a number of UE or access terminals (ATs) directly or indirectly supported by the at least one CPE.

21. The method of claim 18, wherein the triggering condition comprises the at least one CPE detecting an activation of a set top box or digital video recorder supported by the at least one CPE.

22. A system, comprising:
   a core network configured to support a Fifth Generation (5G) network comprising a plurality of Citizens Broadband Radio Service Device (CBSD) nodes configured for communicating via granted spectrum with customer premises equipment (CPE) and user equipment (UE) to provide network services thereto;

wherein the core network comprises a policy control function (PCF) configured to receive from each CBSD node a respective list of CPE connected devices supported by the CBSD node, the PCF responsively calculating for each CPE a respective bandwidth requirement sufficient to support respective CPE connected devices, and transmitting the calculated CPE bandwidth requirement toward the respective CBSD for use by the respective CPE; and wherein each CPE bandwidth requirement is configured to cause a respective CPE to determine respective connected UE capability information sufficient to support the CPE bandwidth requirement, the UE capability information enabling the CBSD to assign a BWP to the CPE sufficient to support respective connected UE.

23. A computer readable apparatus comprising a non-transitory storage medium, the non-transitory storage medium comprising at least one computer program having a plurality of instructions, the plurality of instructions configured to, when executed on a processing apparatus, cause a policy control function (PCF) of a core network to:

receive, from a CBSD node, a data structure of one or more computerized devices supported by at least one of (i) the CBSD node, or (iii) consumer premises equipment (CPE);

calculate for the CPE, a bandwidth requirement sufficient to support the one or more computerized devices; and transmit the bandwidth requirement toward the CBSD node for use by the CPE;

wherein the bandwidth requirement enables the CPE to determine capability information sufficient to support the bandwidth requirement, the capability information enabling the CBSD node to assign a resource bandwidth part (BWP) to the CPE, the BWP being sufficient to support the capability information.

* * * * *